United States Patent [19]
Fuller et al.

[11] Patent Number: 4,828,335
[45] Date of Patent: May 9, 1989

[54] CONTROL VALVE FOR VEHICLE ANTI-LOCK BRAKE SYSTEM

[75] Inventors: Edward N. Fuller, Manchester; Gary A. Willi, Ann Arbor, both of Mich.

[73] Assignee: Kelsey-Hayes Company, Romulus, Mich.

[21] Appl. No.: 53,221

[22] Filed: May 22, 1987

Related U.S. Application Data

[63] Continuation-in-part of Ser. No. 764,162, Aug. 9, 1985, Pat. No. 4,668,023.

[51] Int. Cl.⁴ .............................................. B60T 8/58
[52] U.S. Cl. ................................ 303/100; 188/181 R; 303/61; 303/68; 303/119; 303/DIG. 4; 303/110
[58] Field of Search .............................. 303/113–119, 303/61–63, 68–69, 6, 84, 91, 92, 100, DIG. 1–DIG. 4, 10–12, 106, 109, 110; 188/181, 349, 151 A; 310/51; 251/129.14–129.22, 129.11–129.13

[56] References Cited
U.S. PATENT DOCUMENTS 4,668,023 5/1987 Every et al. ........................ 303/68
4,673,226 6/1987 Every et al. ...................... 303/109

Primary Examiner—Douglas C. Butler
Attorney, Agent, or Firm—Ralph J. Skinkiss; Mark J. Sobanski

[57] ABSTRACT

A control valve for an anti-lock brake system includes a one-piece valve body having an inlet opening in one end and an outlet opening in an opposite end. The valve body is provided with four other openings extending into the body and defining separate associated chambers for respectively receiving an isolation valve assembly, a pressure differential switch assembly, a dump valve assembly and an accumulator assembly. The inlet, outlet, and the four internal chambers are connected by appropriate internal passageways. The control valve is used to selectively hold, dump, or reapply brake fluid pressure to selected wheel brakes to prevent lock-up of the associated wheels.

21 Claims, 5 Drawing Sheets

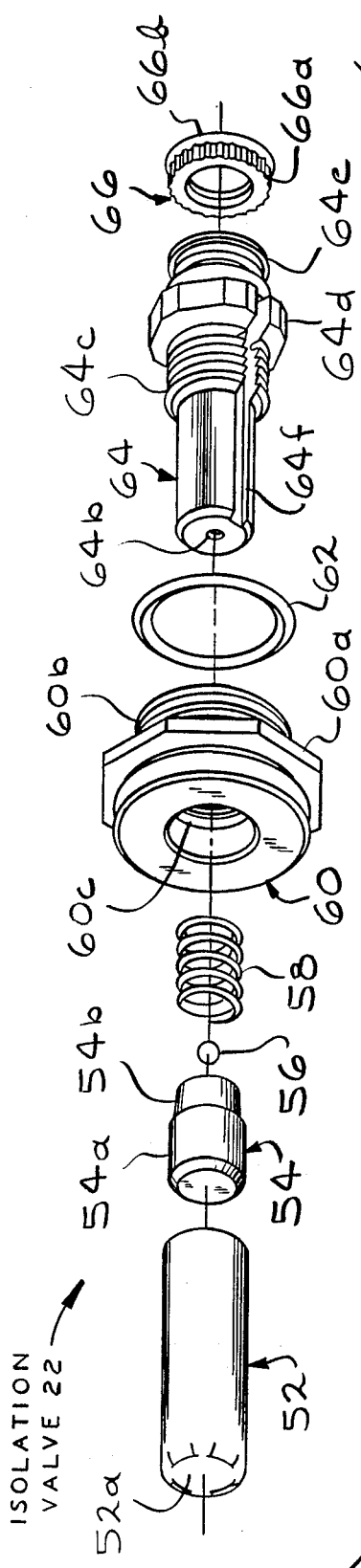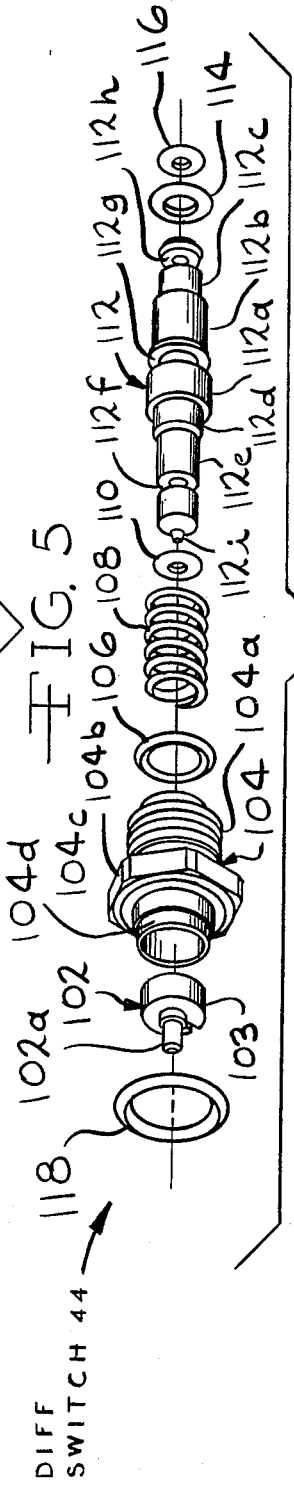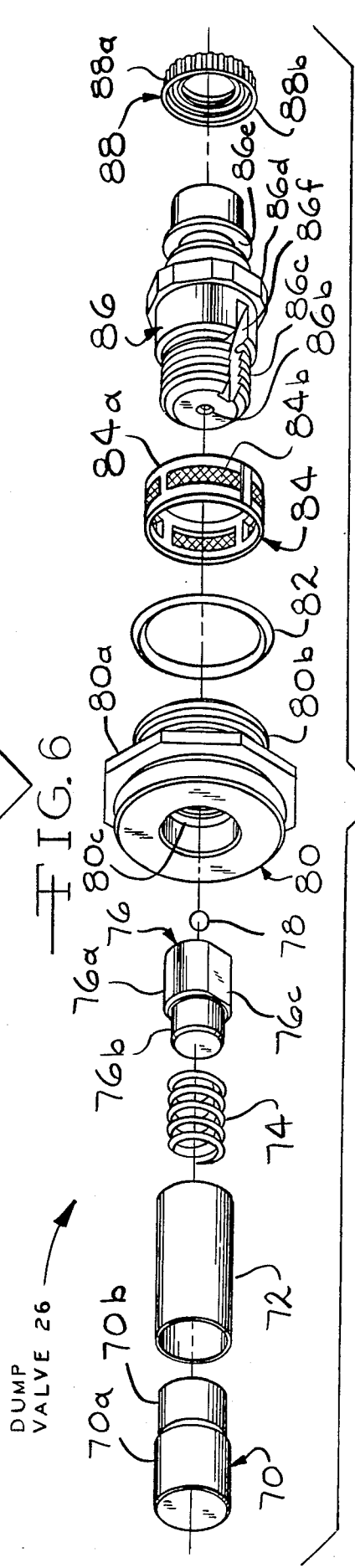

CONTROL VALVE FOR VEHICLE ANTI-LOCK BRAKE SYSTEM

CROSS-REFERENCE TO RELATED APPLICATIONS

This application is a continuation-in-part of copending application, Ser. No. 764,162, filed Aug. 9, 1985, now U.S. Pat. No. 4,668,023 entitled CONTROL AN ANTI-LOCK BRAKE SYSTEM and assigned to the assignee of the present invention to which is related in subject matter to copending application, Ser. No. 702,765, filed Feb. 19, 1985, now U.S. Pat. No. 4,673,226, 4entitled VEHICLE CONTROL SYSTEM and assigned to the assignee of the present invention.

BACKGROUND OF THE INVENTION

This invention relates generally to vehicle anti-lock brake systems and, more particularly, to an improved control valve for such systems wherein the valve is used to selectively control the application of hydraulic fluid pressure to selected brakes to prevent locking of the associated wheels.

Braking a vehicle in a controlled manner under adverse conditions such as rain, snow, or ice generally requires precise application of the brakes by the vehicle driver. Under these conditions, or in panic stop situations, a driver will often apply excessive brake pressure, thus causing the wheels to lock such that excessive slippage between the wheels and the road surface takes place. Wheel lockup conditions can lead to loss of directional stability and, possibly, uncontrolled vehicle spinout.

In a continuing effort to improve the operational safety of vehicles, many companies have been involved in the development of anti-lock braking systems. While typically such systems are adapted to control the braking of each braked wheel of a vehicle, some systems have been developed for controlling the braking of only a portion of the braked wheels. Examples of prior art anti-lock brake systems are disclosed in U.S. Pat. Nos. 3,515,440; 3,731,979; 3,870,376; and 3,880,474.

Generally, prior art anti-lock brake systems include a central control unit for monitoring the speed of the controlled wheels to determine the deceleration of the controlled wheels. When the brakes of the vehicle are applied and the wheel deceleration of the monitored wheels exceeds a predetermined deceleration threshold, indicating that there is wheel slippage and the wheels are approaching a lockup condition, the central control unit functions to control the application of hydraulic pressure through a control valve means to the associated brakes to prevent lockup of the controlled wheels. Typically, the anti-lock brake system includes means for cyclically relieving and reapplying pressure to the associated brakes to limit wheel slippage to a safe level while continuing to produce adequate brake torque to decelerate the vehicle as desired by the driver. In these systems, the means for reapplying pressure is generally a separate hydraulic power source. An example of an anti-lock brake system which does not require the use of a separate hydraulic pump is disclosed in U.S. Pat. No. 4,418,966.

Despite the tremendous advantages a skid control system can provide in stopping a vehicle in a controlled manner under adverse braking conditions, few vehicles are actually provided with such control systems. One of the chief reasons for this is that the control units and associated valving of such systems are somewhat sophisticated and expensive, and are therefore typically only found on more expensive vehicles.

SUMMARY OF THE INVENTION

The present invention concerns a unique control valve for use with a vehicle anti-lock braking system. Basically, the anti-lock braking system is adapted to control, via the control valve, the application of brake fluid pressure to at least one selected braked wheel of an associated vehicle. When an incipient wheel lock condition of the controlled wheels is detected, further application of fluid pressure to the controlled wheel brake is cut off by the control valve and the fluid pressure to the controlled wheel brakes at that time is held at a relatively constant level, and is maintained at that level during the completion of the wheel stop unless certain conditions are present. For example, if after the brake pressure is held, the controlled wheel deceleration exceeds a predetermined amount, the control valve is operated to selectively reduce the brake pressure to the controlled wheel to reduce excessive wheel slippage. Also, in certain situations, the control valve is operated to reapply pressure to the controlled wheel brakes.

The control valve of the present invention is specifically designed for use in an anti-lock brake system for a vehicle having first and second sets of wheel brakes. A brake pedal is operable by the vehicle operator and is connected to actuate a master cylinder for supplying pressurized brake fluid. The pressurized brake fluid is supplied to a first brake pressurizing circuit to actuate the first set of wheel brakes, and is also supplied to a second brake pressuring circuit to actuate the second set of wheel brakes. The control valve of the present invention is connected in the second brake pressurizing circuit, and is operable by a computer control means.

More specifically, the control valve includes an outer housing having an inlet coupled to receive pressurized brake fluid from the master cylinder and an outlet coupled to supply pressurized brake fluid to the second set of wheel brakes. A passageway connecting the inlet to the outlet is formed in the housing. A normally open isolation valve is located in the passageway and is utilized to control the flow of fluid through the passageway between the inlet and the outlet. The control valve includes means for closing the isolation valve to hold the fluid pressure to the second set of wheel brakes at a relatively constant level. Further, the valve includes means for momentarily opening the isolation valve after the valve has been closed to selectively reapply pressure from the master cylinder to the second set of wheel brakes. A normally closed dump valve is connected between the passageway and a fluid accumulator. After the isolation valve is closed, the dump valve can be momentarily opened to supply fluid to the accumulator to selectively reduce pressure to the second set of wheel brakes. Also, a pressure differential switch is provided for monitoring the pressure differential across the isolation valve.

In accordance with the invention, the control valve is provided with an elongate one-piece valve body having an internally threaded inlet passageway at one end and an internally threaded outlet passageway at an opposite end. A face of the body between the ends has three internally threaded passageways leading into appropriate chambers for respectively receiving an isolation valve assembly, a pressure differential switch assembly, and a dump valve assembly. In the end of the valve body having the outlet passageway, another internally threaded passageway is provided, and leads into an appropriate chamber for receiving an accumulator assembly. The longitudinal center lines of all these passageways lie in a single central plane bisecting the valve body.

In addition to having a unique overall construction, the valve also includes several other unique features. In particular, a check valve means is connected across the isolation valve between the inlet and the outlet to prevent higher pressure fluid from flowing from the inlet to the outlet when the isolation valve is closed, but permitting higher pressure fluid to flow from the outlet to the inlet to provide a flow path separate from the open isolation valve for returning fluid to the master cylinder after the brake pedal is released. Also, the differential pressure switch is connected to monitor the pressure in the accumulator, thus enabling a leaking dump valve to be detected during normal or non-anti-lock braking conditions. A resistor is connected across the differential pressure switch and is carried by the valve, thus enabling the continuity of the associated switch wiring to be checked up to the valve. Further, the normally open isolation valve is solenoid actuated, and includes a spring-biased moveable armature which is located within the valve body such that pressurized input fluid urges the armature to the open position. It has been found that this arrangement, combined with the check valve connected across the isolation valve, reduces the size of the biasing spring and actuating coil required to operate the valve.

The above, as well as the other features and advantages of the present invention, will become readily apparent to one skilled in the art from reading the following detailed description in conjunction with the attached drawings.

BRIEF DESCRIPTION OF THE DRAWINGS

FIG. 5 is an exploded isometric view of an isolation valve assembly shown in FIG. 4 for mounting in a left-hand passageway of a three-passageway face of the control valve body;

FIG. 6 is an exploded isometric view of a pressure differential switch assembly shown in FIG. 4 for mounting in a central passageway of the three-passageway face of the control valve body; and FIG. 7 is an exploded isometric view of a dump valve assembly shown in FIG. 4 for mounting in a right-hand passageway of the three-passageway face of the control valve body.

DESCRIPTION OF THE PREFERRED EMBODIMENT

It should be noted at the outset of this description that, while the control valve is described herein for use with an anti-lock brake system which is adapted for use with a system for controlling only the rear wheels, the entire valve (or portions thereof) can also be used in four wheel control systems.

Figure 1:
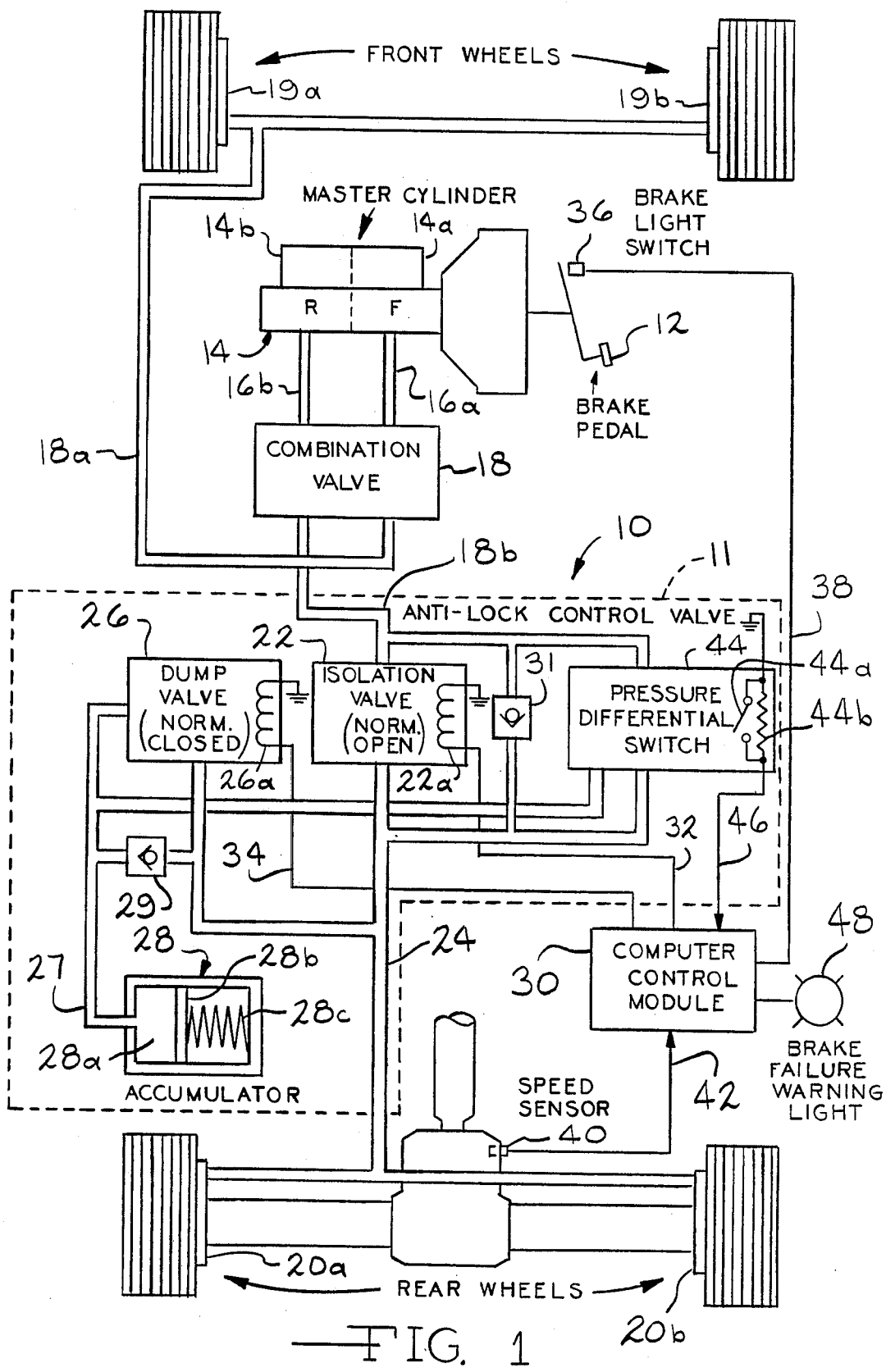
FIG. 1 is a schematic diagram illustrating a vehicle anti-lock brake system in which the control valve of the invention may be used.

With reference to the drawings, FIG. 1 shows a schematic diagram of a vehicle anti-lock brake system including a control valve 10 constructed in accordance with the present invention and containing the items within the area defined by the dashed line 11. The anti-lock brake system is specifically adapted to monitor and control the braking of a predetermined number of wheels of a multi-wheeled vehicle having at least one braked wheel which is not connected to the anti-lock brake system. For example, as illustrated in FIG. 1, the anti-lock brake system can be utilized to control the braking of the rear wheels of a four wheeled vehicle wherein the front brakes of the vehicle are not controlled by the anti-lock brake system. Such a system is especially desirable for a vehicle such as a small truck, for example, wherein the weight supported by the rear wheels can vary greatly due to the wide range of payloads the truck may be transporting.

As shown in FIG. 1, the anti-lock brake system is installed on a vehicle having a hydraulic braking system consisting of a brake pedal 12 coupled to operate a dual reservoir master cylinder 14. When the vehicle operator depresses the brake pedal 12, the master cylinder 14 supplies hydraulic fluid under pressure from a front reservoir 14a through a hydraulic line 16a and from a rear reservoir 14b through hydraulic line 16b to a conventional combination valve 18. The combination valve 18 includes a first output line 18a adapted to supply hydraulic fluid at a first predetermined pressure to actuate the vehicle front brakes 19a and 19b and a second output line 18b which supplies fluid at a second predetermined pressure to actuate the vehicle rear brakes 20a and 20b. While not shown in the drawings, the combination valve 18 is typically provided with an integral differential pressure switch for detecting a predetermined pressure difference between the fluid in the lines 16a and 16b, which difference is indicative of a partial brake failure.

In accordance with the present invention, the anti-lock control valve 10 is provided with a normally open isolation valve 22 connected between the line 18b and a line 24 which supplies the pressurized brake fluid to the rear brakes 20a and 20b. As will be discussed, the isolation valve 22 is solenoid operated and is closed in the event impending rear wheel lockup is detected to hold the pressure in the line 24 and thus prevent any further increase in pressure in the line 18b from being supplied to line 24.

Also, in accordance with the present invention, the anti-lock control valve 10 includes a normally closed dump valve 26 connected between the line 24 and a line 27 which is connected to an accumulator 28. The accumulator 28 includes a variable volume fluid reservoir 28a for containing hydraulic fluid which is maintained at a slightly elevated pressure by a slidable piston 28b biased by a spring 28c. More specifically, the spring 28c maintains the fluid in the accumulator at a pressure slightly above the non-actuated pressure of the fluid in the line 24. As will be discussed, when the isolation valve 22 has been closed and the pressure held in the line 24 continues to cause excessive slippage of the rear wheels, the dump valve 26 is selectively opened to direct fluid into the accumulator 28 to reduce the pressure in the line 24 and prevent lockup of the rear brakes. After brake pedal 12 has been released, the isolation valve 20 is opened and the pressurized fluid in the accumulator 28 can be returned to the line 24 through a check valve 29. Alternatively, the check valve 29 can be eliminated and the dump valve 26 can be momentarily opened after the brake pedal is released to return fluid in the accumulator 28 to the line 24. A check valve 31 is connected across the isolation valve 22 between the lines 18b and 24 and provides for fluid flow from the line 24 to the line 18b when the pressure in the line 24 is greater than the pressure in the line 18b. Thus, when the brake pedal is released and the isolation valve is opened, higher pressure in the line 24 can flow to the line 18b through both the open isolation valve 22 and the check valve 31.

The operation of the isolation valve 22 and the dump valve 26 is controlled by a computer control module 30. The isolation valve 22 and the dump valve 26 are solenoid operated valves having solenoids 22a and 26a which can be connected to the computer control module by means of electric lines 32 and 34 respectively. In order to determine whether the vehicle operator is in the process of braking the vehicle, the computer control 30 is connected to a brake light switch 36 by a line 38 to monitor whether the brake pedal 12 is depressed. The computer control module 30 is also connected by a line 42 to a speed sensor 40 which monitors the average speed of the vehicle rear wheels by sensing the rotation of the rear differential ring gear (not shown).

In addition to monitoring the position of the brake pedal 12 via the brake light switch 36 and the rear wheel speed via the speed sensor 40, the computer control 30 module 30 is connected to a differential pressure switch 44 by a line 46. In accordance with the present invention, the switch provides two separate functions. First, when the system is operating in the anti-lock mode, the switch 44 is used to monitor the differential pressure across the isolation valve. Secondly, when the system is not in the anti-lock mode and the vehicle is in a normal braking mode, the switch 44 is used to monitor the condition of the dump valve.

To perform its first function, the differential pressure switch 44 is coupled to monitor the pressure difference between the fluid in the lines 18b and 24 and is adapted to close contacts 44a to ground the line 46 when the pressure in the line 18b is greater than the pressure in the line 24. When the system is in the anti-lock mode and the differential pressure switch contacts 44a are closed, this indicates that the isolation valve has closed and that the pressure in the line 18b is greater than the pressure in the line 24, and when the switch contacts 44a are open, this indicates that the pressure in the line 18b is equal to or has dropped below the pressure in the line 24.

In instances wherein the contacts 44a have closed, and have subsequently opened while the brake light switch 36 has remained actuated, this indicates a situation wherein the operator has initially applied a relatively heavy braking effort to the brake pedal to cause the system to enter an anti-lock mode and close the isolation valve to prevent lockup of the rear wheels and, subsequently, has reduced braking effort to the pedal without necessarily completely releasing the pedal. It is in this situation that it is desirable to release the anti-lock mode and return the braking system to the normal operating mode. Thus, if the system senses that the differential pressure switch contacts 44a have at one point closed, but are now opened, and the brake pedal is still depressed, the system will return to the normal braking mode. Typically, there is some hysteresis associated with the operation of the differential pressure switch 44 such that the switch contacts 44a do not chatter between a closed and open condition when the pressure in the line 18b remains relatively equal to the pressure in the line 24.

When the brake system is not operating in the anti-lock mode, the differential switch is connected to check the valve seat condition of the dump valve 26 by monitoring the fluid pressure in the accumulator 28. At this time, the accumulator 28 should be empty, and the normally closed dump valve 26 should prevent pressurized fluid in the line 24 from being supplied to the accumulator. However, in the event fluid leaks past the dump valve seat into the accumulator, the pressure increase in the line 27 will be detected by the switch 44, which closes the switch contacts 44a to signal the control 30 of a potentially defective dump valve.

As shown in FIG. 1, the differential switch 44 can be provided with an integral resistor 44b connected in parallel with the switch contacts 44a. The resistor 44b typically has a relatively high resistance value, such as 10K ohms. The resistor 44b enables the computer control module 30 to check the continuity of the line 46 when system is not in the anti-lock mode and the contacts 44a are open. In these instances, the line 46 should provide a signal path to ground through the resistor 44b. The control module 30 is connected to a brake failure warning light 48 which is activated in the event a failure in the anti-lock brake system is detected.

Basically, the anti-lock brake system monitors the rear wheel speed and deceleration and, during braking of the vehicle, functions to control the application of hydraulic pressure to the vehicle rear brakes via the control valve 10 in order to prevent a lockup condition of the brakes. In the event a wheel slip condition is detected, indicating the rear brakes are approaching a lockup condition, the control module 30 closes the isolation valve 22 to hold the pressure in the line 24 at its present value. If, after the isolation valve 22 has been closed, the rear wheel deceleration rate exceeds a predetermined amount, the dump valve 26 can be selectively opened to reduce the pressure in the line 24 to prevent a lockup condition of the brakes.

In some instances, after an impending lockup condition has been corrected, it is desirable to reapply additional pressure to the rear brakes to increase braking of the rear wheels. For example, the system monitors the rate of change of deceleration of the rear wheels to detect instances wherein the vehicle travels from a road surface such as ice wherein the coefficient of friction (mu) between the vehicle and the road surface is relatively low (low mu surface) to a road surface such as concrete wherein the coefficient of friction between the vehicle and the road surface is relatively high (high mu surface). In these instances, when the vehicle front wheels contact the higher mu surface, the uncontrolled front brakes will cause an increase in the rate of deceleration of the vehicle as the vehicle travels from the low mu surface to the high mu surface. Under these conditions, the pressure held in the line 24 to the rear brakes can generally be increased to provide further braking without causing a lockup condition of the rear brakes. This is accomplished by momentarily opening the isolation valve 22 to permit the higher pressure fluid in the line 18b to be supplied to the line 24. Due to the continued braking effort by the driver on the vehicle brake pedal under a hard braking condition, the pressure in the line 18b will generally be higher than the pressure in the line 24.

Figure 2:
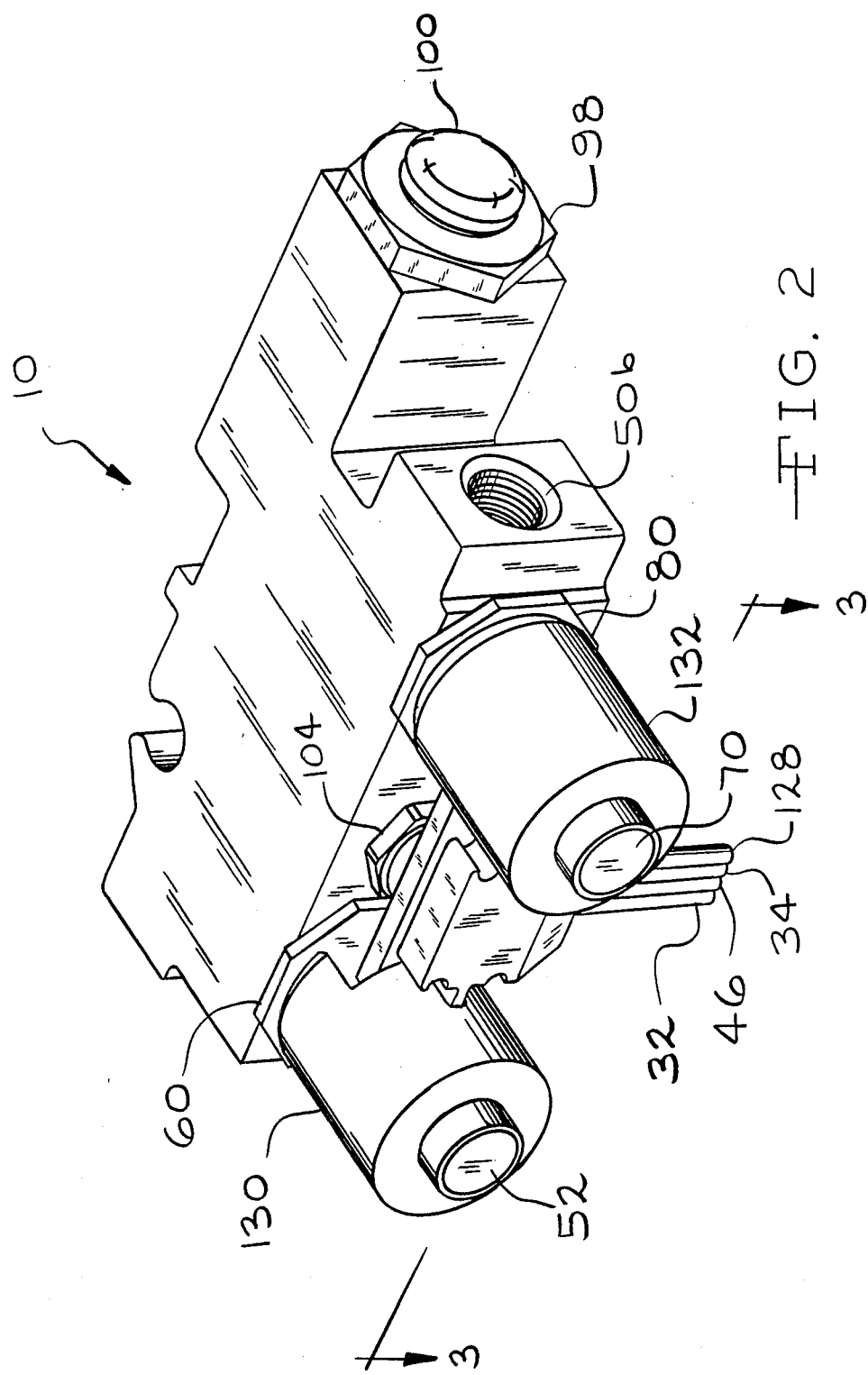
FIG. 2 is an isometric view of the control valve of the invention.
Figure 3:
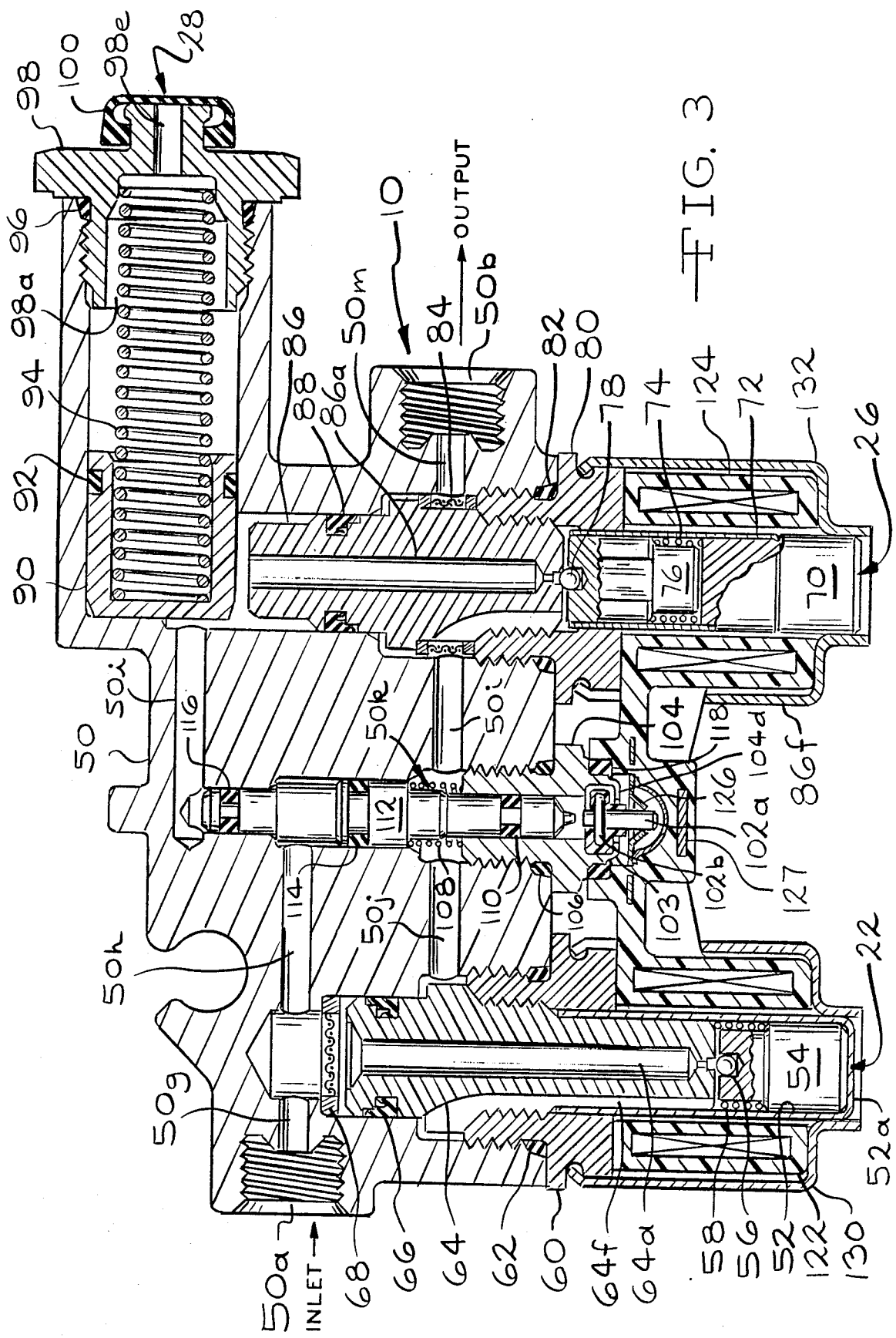
FIG. 3 is a central longitudinal sectional view taken in the direction of arrows 3—3 of FIG. 2.
Figure 4:
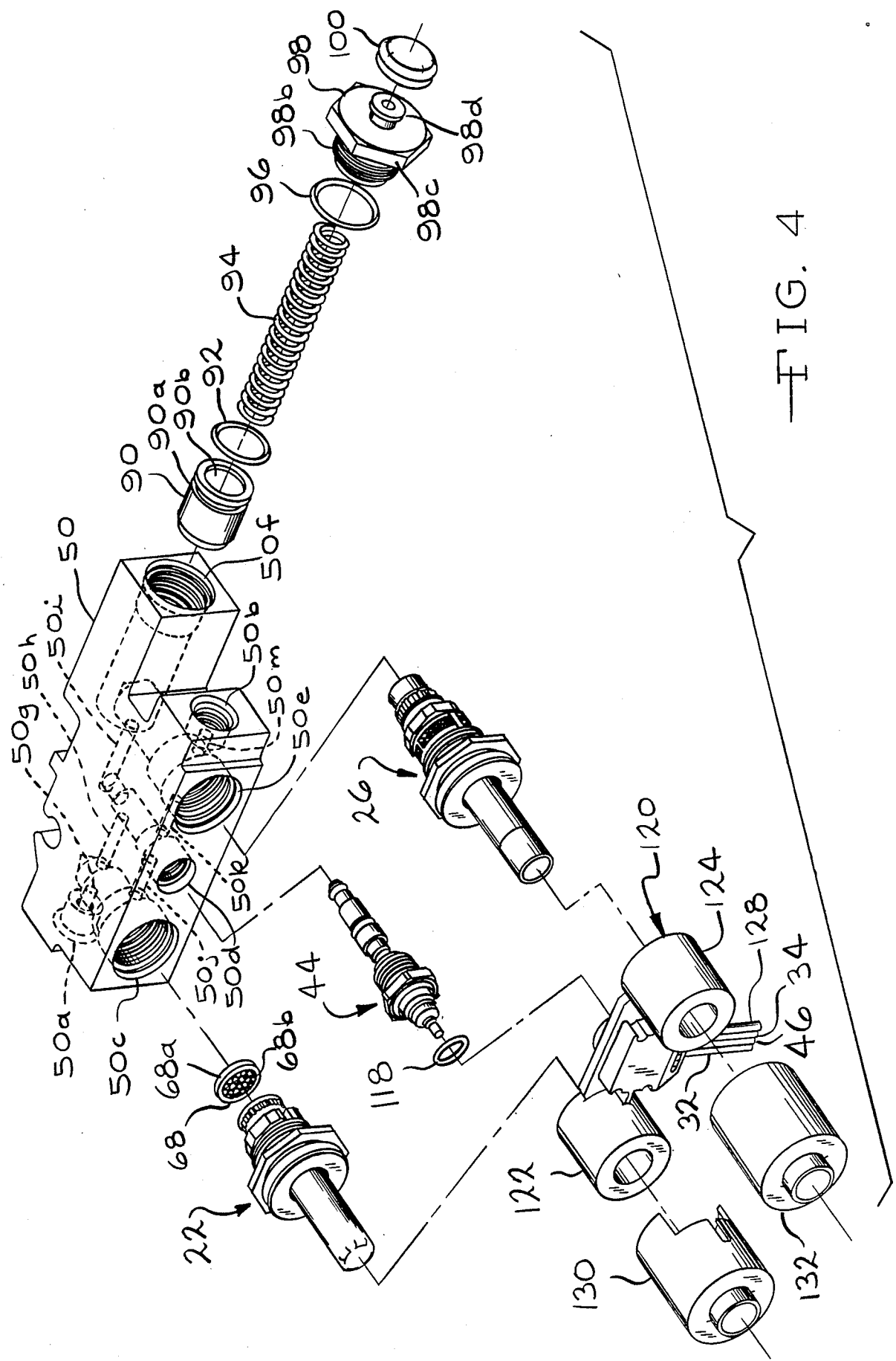
FIG. 4 is an exploded isometric view of the control valve of FIG. 2.

The specific construction of the control valve 10 of the present invention is shown in FIGS. 2, 3, and 4. The valve 10 includes an elongate one-piece valve body 50 having six internally threaded access passageways 50a, 50b, 50c, 50d, 50e and 50f, best shown in FIG. 4. The passageway 50a is an inlet passageway disposed at one end of the valve body 50 and is adapted to be connected to the combination valve 18 by the fluid line 18b. The passageway 50b is an outlet passageway disposed at an opposite end of the valve body 50 and is adapted to be connected to the rear brakes 20a and 20b by the fluid line 24. The passageways 50c, 50d, and 50e are formed perpendicular to the inlet and outlet passageways 50a and 50b and are disposed on a face of the valve body 50 between the ends. The passageway 50c and an associated internal chamber are adapted to receive the normally open isolation valve assembly 22, best shown in FIG. 5. The passageway 50d and an associated internal chamber are adapted to receive the differential pressure switch assembly 44, best shown in FIG. 6. The passageway 50e and an associated internal chamber are adapted to receive the normally closed dump valve assembly 26, best shown in FIG. 7. The passageway 50f and an associated internal chamber, disposed at the same end of the valve body 50 as the outlet passageway 50b, are adapted to receive the accumulator assembly 28, best shown in FIG. 4. The chambers for the dump valve assembly and the accumulator assembly are joined adjacent inner ends thereof.

As shown in FIG. 4, six internal connecting passageways 50g, 50h, 50i, 50j, 50k, and 50m are provided in the valve body 50. The passageway 50g connects the inlet passageway 50a and an nner end portion of the chamber for the isolation valve assembly 22. The passageway 50h connects the inner end portion of the chamber for the isolation valve assembly 22 and a central portion of the chamber for the differential pressure switch assembly 44. The passageway 50j connects an outer end portion of the chamber for the isolation valve assembly 22 and an outer end portion of the chamber for the differential pressure switch assembly 44. The passageway 50i connects an inner end portion of the chamber for the differential pressure switch assembly 44 and the inner end of the chamber for the accumulator assembly 28. The passageway 50k connects an outer end portion of the chamber for the differential pressure switch assembly 44 and an outer end portion of the chamber for the dump valve assembly 26. The passageway 50m connects the outlet passageway 50b and an outer end portion of the chamber for the dump valve 26. It is apparent that the passageways 50g and 50h can be drilled from the inlet passageway 50a, the passageway 50i can be drilled from the accumulator passageway 50f, and the passageways 50j, 50k, and 50m can be drilled from the outlet passageway 50b.

The individual components which comprise the normally open isolation valve assembly 22 are shown in FIG. 5. These components include a sleeve 52, an armature 54, a ball valve 56, a compression coil spring 58, an adapter 60, an O-ring seal 62, a valve seat member 64, and a one-way annular lip seal 66. The armature 54 is constructed of a ferrous material and preferably the sleeve 52, the ball valve 56, the adapter 60, and the valve seat member 64 are also all constructed of a ferrous material. A filter assembly 68 is used in conjunction with the isolation valve assembly 22, and is inserted into the isolation valve chamber before the valve assembly 22. An assembled view of the isolation valve assembly is shown in FIG. 4, while a sectional view can be found in FIG. 3.

The sleeve 52 is closed at an outer end 52a and, as shown in FIG. 3, has its open inner end inserted within and brazed to the adapter 60. The armature 54 is slidably mounted within the sleeve 52 and has an outer cylindrical portion 54a and a smaller diameter inner cylindrical portion 54b. The larger portion 54a is guided by the sleeve 52 to permit limited reciprocal axial movement of the armature 54 within the sleeve 52. The coil spring 58 surrounds the smaller portion 54b, and is compressed between the inner end of the larger portion 54a and an outer end face of the valve seat member 64 to urge the armature to a normally open position. The ball valve 56 is partially recessed and frictionally secured within a central, cavity formed in an inner end face of the armature 54.

As shown in FIG. 3, in the normally open position, the outer end surface of the armature 54 engages the inner surface of the outer end 52a of the sleeve 52. The larger portion 54a of the armature 54 is formed of a diameter slightly less than the inner diameter of the sleeve 52. When the armature is moved to a closed position, the outer end surface of the armature 54 is spaced from the inner end surface of the sleeve end 52a to form a chamber therebetween. This chamber varies in volume as the armature is moved between closed and open positions. The chamber is either filled or emptied with brake fluid which flows through an annular restriction defined between the outer surface of the armature portion 54a and the inner surface of the sleeve 52. This annular restriction causes hydraulic damping of the armature 54 as the armature is moved between closed and open positions. It has been found that such damping enables the reapplication of additional pressure to the rear brakes, which is accomplished by momentarily pulsing a closed isolation valve open, to be more precisely controlled. The exact gap of the annular restriction can be selected to provide a predetermined degree of damping. A more detailed discussion of the hydraulic damping feature, along with another example of a hydraulic damping arrangement, can be found in U.S. patent application Ser. No. 764,162, filed Aug. 9, 1985, now U.S. Pat. No. 4,668,023, and herein incorporated by reference.

An outer end portion of the adapter 60 includes a flange 60a provided with suitable wrench surfaces. An inner end portion thereof is provided with external threads 60b for cooperation with the threaded passageway 50c in the valve body 50. Also, internal threads 60c are provided for receiving the valve seat number 64. The O-ring seal 62 is assembled on the adapter 60 adjacent the inner side of the flange 60a.

The valve seat member 64 is provided with a longitudinal passageway 64a (FIG. 3) having a valve seat 64b at the one end adjacent the ball valve 56. In FIG. 3, the ball valve 56 is in its open position and is shown spaced from the valve seat 64b. A central portion 64c of the valve seat member is provided with external threads for cooperation with the internal threads 60c of the adapter 60. The valve seat member 64 includes a flange portion 64d disposed inwardly of the threaded central portion 64c and provided with suitable wrench surfaces. An inner end portion of the valve seat member is provided with an annular groove 64e for receiving the one-way lip seal 66. Further, the valve seat member 64 is provided with a longitudinal groove 64f extending from the valve seat 64b through the flange portion 64d. The one-way lip seal 66 (which corresponds to the check valve 31 of FIG. 1) includes an annular body portion 66a, preferably having axial grooves on its outer periphery, and an annular outwardly flared flexible lip portion 66b which blocks fluid flow past the seal from the valve inlet to the valve outlet when the isolation valve is closed and the inlet pressure is greater than the outlet pressure, but permits fluid flow past the seal from the outlet to the inlet when the output pressure is greater than the input pressure. The filter 68 includes an annular frame 68a and a flat circular screen 68b secured to the inner periphery of the frame.

The exploded isometric view of FIG. 7 illustrates the individual components of the normally closed dump valve assembly 26. These components include a core 70, a sleeve 72, a compression coil spring 74, an armature 76, a ball valve 78, an adapter 80, an O-ring seal 82, a filter assembly 84, a valve seat member 86, and a one-way annular lip seal 88. The armature 76 is constructed of a suitable ferrous material and preferably the core 70, the sleeve 72, the ball valve 78, the adapter 80, and the valve seat member 86 are also all constructed of a ferrous material. An assembled view of the dump valve assembly is shown in FIG. 4, while a sectional view is shown in FIG. 3.

The core 70 has a cylindrical outer end 70a and a smaller diameter inner end 70b. One end of the sleeve 72 is slipped over the smaller inner end 70b of the core and brazed thereto. An opposite end portion of the sleeve 72 is received in the adapter 80 and brazed thereto.

The armature 76 is slidably mounted within the sleeve 72 and has a generally cylindrical inner end portion 76a and a smaller diameter cylindrical outer end portion 70b. The larger portion 76a is guided by the sleeve 72 to permit limited reciprocal axial movement of the armature 76 within the sleeve. The larger portion 76a is provided with a pair of flats 76c, only one of which is shown, and which function to form fluid passageways with respective portions of the sleeve 72 and prevent resistance to movement by any entrapped fluid. The coil spring 74 surrounds the smaller portion 76b of the armature, and is compressed between the inner end of the core 70 and outer end of the larger diameter armature portion 76a. In FIG. 3, the spring 74 maintains the dump valve in a normally closed position such that the outer end surface of the smaller armature portion 76b is slightly spaced from the inner end surface of the core 70. When the dump valve is in the open position, the armature end will be in engagement with the core end. The ball valve 78 is partially recessed and frictionally secured within a central cavity formed in an inner end face of the armature 76.

The adapter 80 is identical to the adapter 60 of the isolation valve assembly 22. The adapter 80 includes a flange 80a provided with suitable wrench surfaces, external threads 80b for cooperation with the threaded passageway 50e in the valve body 50, and internal threads 80c. The O-ring seal 82 is assembled on the adapter 80 adjacent an inner side of the flange 80a.

The filter 84 includes an annular frame 84a sealingly secured about an intermediate portion of the valve seat member 86 and having peripheral apertures covered by screen material 84b. The valve seat member 86 is provided with a longitudinal passageway 86a (FIG. 3) and with a valve seat 86b for the ball valve 78 at its outer end. In FIG. 3, the ball valve 78 is in its closed position and is shown in engagement with the valve seat 86b. Further, an outer end portion 86c is provided with external threads for cooperation with the internal threads 80c of the adapter 80. The valve seat member 86 includes a central flange portion 86d provided with suitable wrench surfaces. An annular groove 86e is formed in the member 86 between its inner end and the flange portion 86d for receiving the one-way lip seal 88. A longitudinal groove 86f is provided in the member 86 and extends from the valve seat 86b, through the threaded portion 86c, and nearly to the flange portion 86d. The one-way seal 88 (which corresponds to the check valve 29 of FIG. 1) includes an annular body portion 88a having axial grooves on its outer periphery and an annular outwardly flared flexible lip portion 88b which blocks fluid flow past the seal and into the accumulator chamber, but permits fluid flow past the seal from the accumulator when the fluid pressure in the accumulator is greater than the pressure in the passageways 50i and 50m.

The accumulator assembly 28 (FIGS. 3 and 4) includes a generally cup-shaped slidable plunger 90 corresponding to piston 28b of FIG. 1, an O-ring seal 92, a compression coil spring 94 corresponding to spring 28c of FIG. 1, an O-ring seal 96, a plug 98, and a boot 100.

The plunger 90 is provided with an annular groove 90a for receiving the O-ring seal 92 and with a recess 90b at one end for receiving an inner end of the spring 94. An inner end of the plug 98 is provided with a recess 98a for receiving an opposite outer end of the spring 94 and with external threads 98b for cooperation with the threaded passageway 50f in the valve body 50. An outer end of the plug 98 includes a flange portion 98c provided with wrench surfaces and a flanged extension 98d for receiving the boot 100. As shown in FIG. 3, the flange portion 98c and the flange extension 98d are provided with a central vent passageway 98e.

The individual components of the differential pressure switch assembly 44 are shown in FIG. 6. These components include a terminal assembly 102, a hollow plug 104, an O-ring seal 106, a compression coil spring 108, an O-ring seal 110, an axially shiftable plunger 112, an O-ring seal 114, an O-ring seal 116, and an O-ring seal 118. An assembled version of the switch assembly is shown in FIG. 4, while a sectional view is shown in FIG. 3.

The terminal assembly 102 includes a contact pin 102a having an enlarged disc-like portion 102b adjacent one end, and an electrical insulator 103 mounted on the portion 102b for electrically insulating the contact pin from the plug 104. An inner end portion of the plug 104 is provided with external threads 104a for cooperation with the threaded passageway 50d in the valve body 50. An outer end portion of the plug 104 includes a flange 104b provided with wrench surfaces, a first tubular extension 104c, and a second tubular extension 104d. The terminal assembly 102 is inserted into the tubular extension 104c, and the extension 104d is rolled radially inwardly as shown in FIG. 3 to secure the terminal assembly 102 in the plug 104. The O-ring seal 106 is assembled on the plug 104 adjacent an inner side of the flange 104b. The O-ring seal 118 is placed around the tubular extension 104c after the extension 104d is rolled inwardly.

The plunger 112 includes a central relatively large diameter portion 112a flanked by successively reduced diameter portions 112b and 112c adjacent an inner end and successively reduced diameter portions 112d and 112e adjacent an outer end. The portion 112e is provided with an annular groove 112f for receiving the O-ring seal 110 and terminates in a contact tip portion 112i. The central portion 112a is provided with an annular groove 112g for receiving the O-ring seal 114, and the portion 112c is provided with an annular groove 112h for receiving the O-ring seal 116.

The armature 54 of the isolation valve assembly 22 and the armature 76 of the dump valve assembly 26 are operable by solenoid coils. The coils for valve assemblies 22 and 26, a plug-in connector for the differential pressure switch contact pin 102a, and associated electrical wires may be encapsulated together into a molded unit 120 as shown in FIG. 4. The molded unit 120 includes a coil 122 (which corresponds to the coil 22a of FIG. 1) for the isolation valve assembly 22, a coil 124 (which corresponds to the coil 26a of FIG. 1) for the dump valve assembly 26, a plug in connector 126 (see FIG. 3) for the differential pressure switch pin 102a in the plug 104, a resistor element 127 (corresponding to the resistor 44b of FIG. 1), associated electrical conductors 32, 46, and 34 such as shown in FIG. 1, and a common ground wire 128. The resistor element 127 is connected between the ends of wires 46 and 128 by suitable connecting means (not shown).

A casing 130 for the coil 122 is mounted on the sleeve 52 of the isolation valve assembly 22 and a casing 132 for the coil 124 is mounted on the core 70 of the dump valve assembly 26. The inner ends of the casings 130 and 132 may be rolled into appropriate annular grooves respectively provided in the adapters 60 and 80, as shown in FIG. 3. The casings 130 and 132 function to retain the molded unit 120 to the valve body 50. In addition, the casings 130 and 132 are constructed of a ferrous material to reduce the reluctance of the magnetic circuit around the outside of the coils.

Normally, when the coil 122 is not energized, the armature 54 and associated ball valve 56 are biased to an open position by the spring 58 such that brake fluid pressure supplied to the rear brakes 20a and 20b via the outlet passageway 50b is at the same pressure as the pressure present at the inlet passageway 50a. More specifically, the brake fluid flows from the inlet passageway 50a through the connecting passageway 50g into the chamber of the isolation valve assembly 22, through the filter assembly 68 and the longitudinal passageway 64a, past the ball valve 56 into a gap of predetermined thickness between adjacent faces of the armature 54 and the member 64 and into the longitudinal groove 64f, around the member 64 into the connecting passageway 50j, around the plunger 112 in the differential pressure switch chamber into the connecting passageway 50k, around the valve seat member 86 in the dump valve chamber and through the filter assembly 84, and out the connecting passageway 50m to the outlet passageway 50b.

When the coil 122 is energized, the magnetic field generated thereby urges the armature 54 in a direction to seat the ball valve 56 on the valve seat 64b and close the valve. This blocks fluid flow from the inlet passageway 50a to the outlet passageway 50b and thus maintains the pressure supplied to the rear brakes 20a and 20b at a constant level. If it is then desired to increase the pressure applied to the rear brakes 20a and 20b by momentarily opening the isolation valve, the amount of pressure increase to the rear brakes can be precisely controlled by forming the opening in the valve seat 64b of a predetermined size, and then controlling the length of time the valve is momentarily opened.

It should be noted that the force exerted on the inner end face of the armature 54 by the input fluid pressure, along with the force exerted by the spring 58, tend to urge the armature to an open position. The only force which tends to close the valve is the magnetic force produced when the associated coil is energized. It has been found that this arrangement, in conjunction with the above-identified hydraulic damping of the armature 54, enables more precise control of the reapplication of additional fluid pressure to the rear brakes by momentarily opening the isolation valve. Also, such an arrangement reduces the size of the spring 58 necessary to keep the valve open, and thus reduces the magnetic force output requirement of the coil 122.

The spring 78 of the dump valve assembly 26 normally biases the armature 76 and associated ball valve 78 to a closed position wherein the ball valve engages the valve seat 86b of the member 86. The dump valve assembly 26 can be selectively opened, after the isolation valve assembly has been closed, to dump fluid into the chamber of the accumulator assembly 28 to selectively reduce the pressure supplied to the rear brakes 20a and 20b. When the coil 124 is energized, the armature 76 and associated ball valve 78 are moved to an open position, and fluid in the dump valve chamber from either of the connecting passageways 50k or 50m flows through the longitudinal groove 86f, into a gap of predetermined thickness between adjacent faces of the armature 76 and the valve seat member 86, past the ball valve 78, and through the passageway 86a to the accumulator chamber, to move the plunger 90 therein and further compress the spring 94, while the vent 90e allows air to escape. The amount of pressure decrease to the rear brakes can be controlled by precisely controlling the length of time the valve is opened.

When the brake pedal 12 is released, the isolation valve is returned to a normally open position, and fluid in the rear brake line 24 can flow through the valve body 50, past the isolation valve seat, and into the line 18b which is connected to the valve inlet. In addition, pressurized fluid can also flow past the one-way lip seal 66 to the valve inlet. It has been found that the one-way lip seal 66 reduces the size of the spring 58 necessary to open the valve after it has been closed, and thus reduces the magnetic force output requirement of the coil 22. Also, fluid under pressure in the accumulator chamber flows back out past the one-way seal 88 on the valve seat member 86 and into the main rear brake circuit.

During an anti-lock braking mode, the differential pressure switch assembly 44 monitors the difference in pressure between the pressure received from the combination valve 18 of FIG. 1 and the pressure supplied to the rear brakes 20a and 20b. If the pressure supplied to the rear brakes in the line 24 is less than or equal to the pressure supplied to the isolation valve assembly by the line 18b, the differential pressure switch contacts are in an open condition. When the pressure in line 18b is greater than the pressure in the line supplied to the rear brakes, indicating that the system has entered the anti-lock mode, the differential pressure switch contacts are closed.

The spring 108 around the plunger 112 of the differential pressure switch assembly 44 normally biases the plunger to maintain the contact tip portion 112i out of contact with the contact pin 102a in the plug 104. The outer end of the central portion 112a of the plunger 112 is exposed at its outer periphery to the rear brake pressure via the connecting passageways 50k and 50m, while the inner end is exposed at its outer periphery to the pressure received from the combination valve 18 via the connecting passageway 50g and 50h.

When the isolation valve assembly 22 is closed, and the force exerted on the inner end of the central portion 112a by the fluid pressure from the combination valve 18 and the passageways 50g and 50h is greater than the force exerted on outer end by the spring 108 and by the fluid pressure from the passageway 50k, the plunger 112 is moved to a closed position wherein the contact tip portion 112i contacts the contact tip 102a, causing a ground potential signal to be generated in the associated electrical line 46 running to the computer control module 30. When the pressure in the passageway 50h has fallen so that the force on the inner end of the central portion 112a exerted thereby is less than the force on the outer end exerted by the spring 108 and the pressure of the fluid in the passageway 50k, the plunger 112 is moved to the open position.

The differential switch assembly also functions to detect a defective dump valve seat. In the event fluid leaks past the normally closed dump valve ball seat during a normal or non-anti-lock stop, the fluid pressure buildup in the chamber of the accumulator assembly 28 is sensed via the passageway 50i by the differential pressure switch assembly 44. After a predetermined pressure buildup, the plunger 112 will shuttle and the contact tip 112i touches the contact pin 102a to generate a ground potential signal on the line 46 to the central control 30.

It should be noted that, since there are no "dead" pockets in the one-piece valve body 50, no bleed valve is required, and normal fluid flow purges any entrapped air. The one-piece valve body 50 is preferably made of an aluminum alloy and results in a smaller, lighter, less costly control valve with fewer parts. Further, the cartridge design of the isolation valve assembly 22 and the dump valve assembly 26 allows initial assembly and pre-testing of the coils 122 and 124 and the ball valves 56 and 78 for proper operation and reliability before the valve assemblies 22 and 26 are mounted in the valve body 50.

It will be appreciated that various modifications may be made in the valve structure shown and described without departing from the spirit and scope of the invention as set forth in the following claims.

What is claimed is:

1. A control valve for a vehicle anti-lock brake system, the control valve comprising:
   a valve body having an inlet, an outlet, and a first passageway formed therein for connecting said inlet and said outlet;
   said valve body having four separate openings extending into said body and defining separate associated chambers;
   a normally open isolation valve assembly mounted in a first of said four openings and its associated chamber;
   a differential pressure switch assembly mounted in a second of said four openings and its associated chamber;
   a normally closed dump valve assembly mounted in a third of said four openings and its associated chamber;
   an accumulator assembly mounted in a fourth of said four openings and its associated chamber;
   said normally open isolation valve assembly operable to selectively block fluid flow from said inlet to said outlet through said first passageway;
   said differential pressure switch assembly connected to monitor the differential pressure across said isolation valve assembly;
   said normally closed dump valve assembly operable to selectively permit fluid flow from said first passageway to said chamber in which said accumulator assembly is mounted.

2. A control valve as defined in claim 1 including a first check valve means mounted in said valve body for permitting higher pressure fluid in said accumulator chamber to flow into said first passageway, and preventing higher pressure fluid in said first passageway from flowing into said accumulator chamber when said dump valve is closed.

3. A control valve as defined in claim 2 wherein said switch means is connected to monitor the pressure in said accumulator chamber.

4. A control valve as defined in claim 3 including a second check valve means mounted in said valve body for permitting higher pressure fluid at said outlet to flow to said inlet, and preventing higher pressure fluid at said inlet from flowing to said outlet when said isolation valve assembly is closed.

5. A control valve as defined in claim 1 wherein said isolation valve assembly includes: an adapter having a flanged outer portion and an internally and externally threaded inner portion, said externally threaded inner portion mounted in said first opening; a sleeve closed at an outer end and having an open inner end portion fixedly mounted in the outer portion of the adapter; an elongate valve seat member having an externally threaded intermediate portion mounted in the inner portion of the adapter and an outer end portion disposed in said sleeve, having a central longitudinal passageway therethrough, having a valve seat at its outer end concentric with said longitudinal passageway, and having an external longitudinal groove extending from said outer end past said externally threaded portion; an armature reciprocally mounted in said sleeve between the closed end thereof and said valve seat; a ball valve only partially recessed and secured in an inner end portion of said armature and movable therewith into and out of engagement with said valve seat; and a compression coil spring mounted on the inner end portion of said armature and normally biasing said armature and ball valve away from said valve seat.

6. A control valve as defined in claim 1 wherein said differential pressure switch assembly includes: a plug having a flanged outer portion and an externally threaded recessed inner portion, said externally threaded inner portion mounted in said second opening; an elongated contact pin mounted in said outer portion of said plug coaxially thereof and electrically insulated therefrom; an elongate plunger having an outer end portion reciprocally mounted principally in said recessed inner portion of said plug and having a contact tip at its outer end movable therewith into and out of engagement with said contact pin; and a compression coil spring mounted on said plunger adjacent an inner end of said plug and normally biasing said plunger and contact tip away from said contact pin.

7. A control valve as defined in claim 1 wherein said dump valve assembly includes: an adapter having a flanged outer portion and an internally and externally threaded inner portion, said externally threaded inner portion mounted in said third opening; a sleeve having an inner end portion fixedly mounted in the outer portion of the adapter; a core fixedly mounted in an outer end portion of said sleeve; an elongate valve seat member having an externally threaded outer end portion mounted in the inner portion of the adapter, having a central longitudinal passageway therethrough, having a valve seat at its outer end concentric with said longitudinal passageway, and having an external longitudinal groove extending from said outer end past said externally threaded portion; an armature reciprocally mounted in an inner end portion of said sleeve between said core and said valve seat; a ball valve only partially recessed and secured in an inner end portion of said armature and movable therewith into and out of engagement with said valve seat; and a compression coil spring mounted on an outer end portion of said armature and normally biasing said armature and ball valve toward said valve seat.

8. A control valve as defined in claim 1 wherein said accumulator assembly includes: a plug having a flanged outer portion and an externally threaded recessed inner portion, said externally threaded inner portion mounted in said fourth opening; an elongate compression coil spring having an end portion mounted principally in said recessed inner portion of said plug; and a generally cup-shaped plunger reciprocally mounted in the chamber for the accumulator assembly and having an open end facing said plug, an opposite end portion of said spring being mounted in said plunger and said spring biasing said plunger away from said plug.

9. A control valve as defined in claim 8 wherein an outer end of said plug has a flanged extension with a central vent passageway communicating with a recess of the recessed inner portion of the plug and a boot is mounted on a flange of the flanged extension.

10. A control valve for use in a vehicle anti-lock braking system adapted to control the application of pressurized brake fluid to at least one selected vehicle brake, said valve comprising:
an outer housing having an inlet coupled to receive pressurized brake fluid and an outlet coupled to supply pressurized brake fluid to the selected vehicle brake, said housing having a first passageway formed therein for connecting said inlet to said outlet;
normally open isolation valve means located in said passageway for controlling the flow of fluid through said first passageway between said inlet and said outlet, said valve means movable between a normally open position wherein fluid can flow from said inlet to said outlet and a closed position wherein fluid is prevented from flowing from said inlet to said outlet;
said valve means being positioned within said outer housing such that pressurized fluid supplied to said inlet urges said valve means to said normally open position;
spring means for exerting a biasing force to urge said valve means toward said normally open position; and
solenoid means responsive to a control signal for moving said valve means from said open position to said closed position.

11. A control valve as defined in claim 10 including check valve means connected between said inlet and said outlet for preventing fluid flow from said inlet to said outlet when said isolation valve means is closed and the fluid pressure at said inlet is greater than the fluid pressure at said outlet, and permitting fluid flow from said outlet to said inlet when the fluid pressure at said outlet is greater than the fluid pressure at said inlet.

12. A control valve as defined in claim 10 wherein said isolation valve means includes an adapter having a flanged outer portion and an internally and externally threaded inner portion, said externally threaded portion threadedly mounted in an internally threaded opening in said outer housing, a sleeve closed at an outer end and having an open inner end portion fixedly mounted in the outer portion of the adapter, an elongate valve seat member having an externally threaded intermediate portion threadedly mounted in said internally threaded portion of the adapter and an outer end portion disposed in said sleeve, said seat member having a central longitudinally passageway therethrough and having a valve seat at its outer end concentric with said longitudinal passageway, said seat member further having an external longitudinal groove extending from said outer end past said externally threaded portion, an armature reciprocally mounted in said sleeve between the closed end thereof and said valve seat, a ball valve only partially recessed and secured in an inner end face of said armature and movable therewith into and out of engagement with said valve seat, said inner end face being exposed to incoming pressurized fluid which urges said armature and said ball valve away from said valve seat, said spring means including a compression coil spring mounted on an inner end portion of said armature and normally biasing said armature and said ball valve away from said valve seat.

13. A control valve for use in a vehicle anti-lock braking system adapted to control the application of pressurized brake fluid to at least one selected vehicle brake, said valve comprising:
an outer housing having an inlet coupled to receive pressurized brake fluid and an outlet coupled to supply pressurized brake fluid to the selected vehicle brake, said housing having a passageway formed therein for connecting said inlet to said outlet;
normally open isolation valve means located in said passageway for controlling the flow of fluid through said passageway between said inlet and said outlet, said valve means movable between a normally open position wherein fluid can flow from said inlet to said outlet and a closed position wherein fluid is prevented from flowing from said inlet to said outlet;
means for moving said isolation valve means from said open position to said closed position and from said closed position to said open position; and
check valve means connected between said inlet and said outlet for preventing fluid flow from said inlet to said outlet when said isolation valve means is closed and the fluid pressure at said inlet is greater than the fluid pressure at said outlet, and permitting fluid flow from said outlet to said inlet when the fluid pressure at said outlet is greater than the fluid pressure at said inlet.

14. A control valve for use in a vehicle anti-lock braking system adapted to control the application of pressurized brake fluid to at least one selected vehicle brake, said valve comprising:
an outer housing having an inlet coupled to receive pressurized brake fluid and an outlet coupled to supply pressurized brake fluid to the selected vehicle brake, said housing having a first passageway formed therein for connecting said inlet to said outlet;

normally open isolation valve means located in said passageway for controlling the flow of fluid through said passageway between said inlet and said outlet, said valve means movable between a normally open position wherein fluid can flow from said inlet to said outlet and a closed position wherein fluid is prevented from flowing from said inlet to said outlet;

means for moving said isolation valve means from said open position to said closed position and from said closed position to said open position;

a fluid accumulator connected to said first passageway by a second passageway;

a normally closed dump valve means operable independently from said isolation valve means located in said second passageway for controlling the flow of fluid to said accumulator, said dump valve means moveable between a normally closed position and an open position for permitting fluid flow from said first passageway to said accumulator through said second passageway;

means for moving said dump valve means from said closed position to said open position and from said open position to said closed position; and a pressure sensing switch connected to said accumulator for monitoring the fluid pressure therein, said switch operable to generate a first signal when the brake fluid pressure in said accumulator is greater than a predetermined amount.

15. A control valve as defined in claim 14 wherein said isolation valve means, said dump valve means, said accumulator, and said pressure sensing switch are all contained in said outer housing.

16. A control valve as defined in claim 14 wherein said switch is also connected between said inlet and said outlet for monitoring the pressure differential across said isolation valve means, said switch operable to generate a second signal when the brake fluid pressure at said inlet is greater than the fluid pressure at said outlet.

17. A control valve as defined in claim 16 wherein the anti-lock braking system is operable in either an anti-lock mode or a normal braking mode and said switch is operable to generate said first signal during said normal braking mode and said second signal during said anti-lock mode.

18. A control valve for use in a vehicle anti-lock braking system having a control means connected to said valve by a wire means, said control means adapted to operate said valve to control the application of pressurized brake fluid to at least one selected vehicle brake, said valve comprising:

an outer housing having an inlet coupled to receive pressurized brake fluid and an outlet coupled to supply pressurized brake fluid to the selected vehicle brake, said housing having a passageway formed therein for connecting said inlet to said outlet;

normally open isolation valve means located in said passageway for controlling the flow of fluid through said passageway between said inlet and said outlet, said valve means moveable between a normally open position wherein fluid can flow from said inlet to said outlet and a closed position wherein fluid is prevented from flowing from said inlet to said outlet;

means for moving said valve means from said open position to said closed position and from said closed position to said open position;

a pressure differential switch connected between said inlet and said outlet for monitoring the pressure differential across said isolation valve means;

said pressure differential switch including a pair of contacts adapted to be connected to said wire means, said contacts being in an open condition when the fluid pressure at said inlet is greater than or equal to the fluid pressure at said outlet and being in a closed condition when the fluid pressure at said inlet is less than the fluid pressure at said outlet; and a resistor means carried by said housing and connected across said switch contacts.

19. A control valve for a vehicle anti-lock brake system, the control valve comprising:

an elongate one-piece valve body having an internally threaded inlet passageway in one end, an internally threaded outlet passageway in an opposite end, three internally threaded passageways opening to a face of the valve body extending between the ends and connected respectively to appropriate chambers in the valve body, and another internally threaded passageway in said opposite end adjacent said outlet passageway and connected to an appropriate chamber in the valve body;

a normally open isolation valve assembly disposed in a first of said three internally threaded passageways and its associated chamber;

a normally open differential pressure switch assembly disposed in a second of said three internally threaded passageway and its associated chamber;

a normally closed dump valve assembly disposed in a third of said three internally threaded passageways and its associated chamber;

an accumulator assembly disposed in said another internally threaded passageway and its associated chamber, with inner ends of the chamber for said dump valve assembly and the chamber for said accumulator assembly being joined;

said valve body also having a first passageway connecting said inlet passageway and an inner end of the chamber for said isolation valve assembly, a second passageway connecting said inner end portion of the chamber for said isolation valve assembly and a central portion of the chamber for said differential pressure switch assembly, a third passageway connecting an outer end portion of the chamber for said isolation valve assembly and an outer end portion of the chamber for said differential pressure switch assembly, a fourth passageway connecting said outer end portion of the chamber for said differential pressure switch assembly and an outer end portion of the chamber for said dump valve assembly, a fifth passageway connecting said outer end portion of the chamber for said dump valve assembly and said outlet passageway, and a sixth passageway connecting an inner end portion of the chamber for said differential pressure switch assembly and said joined inner ends of the chambers for said dump valve assembly and said accumulator assembly;

said isolation valve assembly including a first adapter having a flanged outer portion and an internally and externally threaded inner portion, a first sleeve closed at an outer end and having an open inner end portion fixedly mounted in the outer portion of said first adapter, an elongate first valve seat member having an externally threaded intermediate portion mounted in the inner portion of said first adapter and an outer end portion disposed in said first sleeve, having a central longitudinal first passageway therethrough, having a valve seat at its outer end concentric with said passageway, and having an external longitudinal groove extending from said outer end past said externally threaded portion, an armature reciprocally mounted in said sleeve between the closed end thereof and said valve seat, a ball valve only partially recessed and secured in an inner end portion of said armature and movable therewith into and out of engagement with said valve seat, and a compression coil spring mounted on an inner end portion of said armature and normally biasing said armature and ball valve away from said valve seat;

said differential pressure switch assembly including a first plug having a flanged outer portion and an externally threaded recessed inner portion, an elongated contact pin mounted in said outer portion of said first plug coaxially thereof and electrically insulated therefrom, an elongate first plunger having an outer end portion reciprocally mounted principally in said recessed inner portion of said first plug and having a contact tip at its outer end movable therewith into and out of engagement with said contact pin, and a second compression coil spring mounted on said first plunger adjacent an inner end of said first plug and normally biasing said first plunger and contact tip away from said contact pin;

said dump valve assembly including a second adapter having a flanged outer portion and an internally and externally threaded inner portion, a second sleeve having an inner end portion fixedly mounted in the outer portion of said second adapter, a core fixedly mounted in an outer end portion of said second sleeve, an elongate second valve seat member having an externally threaded outer end portion mounted in the inner portion of said second adapter, having a central longitudinal second passageway therethrough, having a second valve seat at its outer end concentric with said second passageway, and having an external longitudinal second groove extending from said outer end past said externally threaded portion, a dump armature reciprocally mounted in an inner end portion of said second sleeve between said core and said second valve seat, a second ball valve only partially recessed and secured in an inner end portion of said dump armature and movable therewith into and out of engagement with said second valve seat, and a third compression coil spring mounted on an outer end portion of said dump armature and normally biasing said dump armature and said second ball valve toward said second valve seat; and said accumulator assembly including a second plug having a flanged outer portion and an externally threaded recessed inner portion, an elongate fourth compression coil spring having an end portion mounted principally in said recessed inner portion of said second plug, and a generally cup-shaped second plunger reciprocally mounted in the chamber for said accumulator assembly and having an open end facing said second plug, an opposite end portion of said fourth spring being mounted in said second plunger and said spring biasing said second plunger away from said second plug.

20. A control valve as defined in claim 19 including a solenoid coil mounted on the sleeve of said isolation valve assembly, a plug-in electrical connector for the contact pin in the plug of said differential pressure switch assembly, and a solenoid coil mounted on the core of said dump valve assembly, said solenoid coils and electrical connector being encapsulated as a molded unit.

21. A control valve as defined in claim 19 wherein an outer end of the plug of said accumulator assembly has a flanged extension with a central vent passageway communicating with a recess of the recessed inner portion of the plug and a boot is mounted on a flange of the flanged extension.

* * * * *